Figure 3:
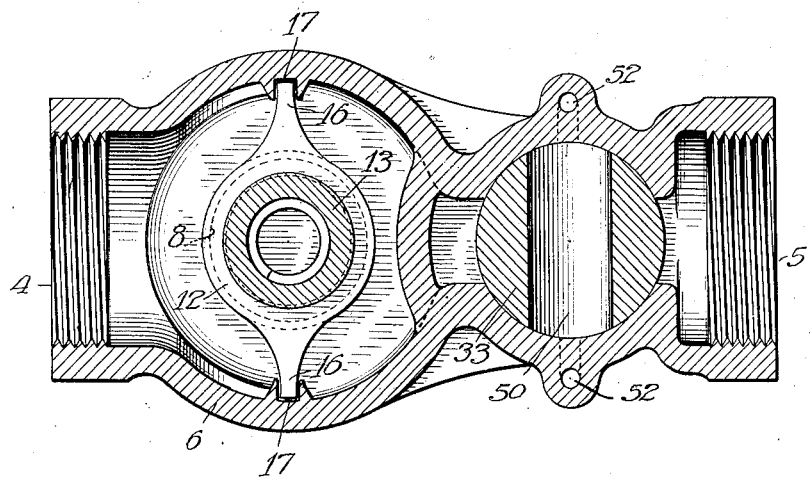

Sept. 8, 1931.     A. F. CORNNER ET AL     1,821,929
VALVE
Filed May 14, 1926     2 Sheets-Sheet 1
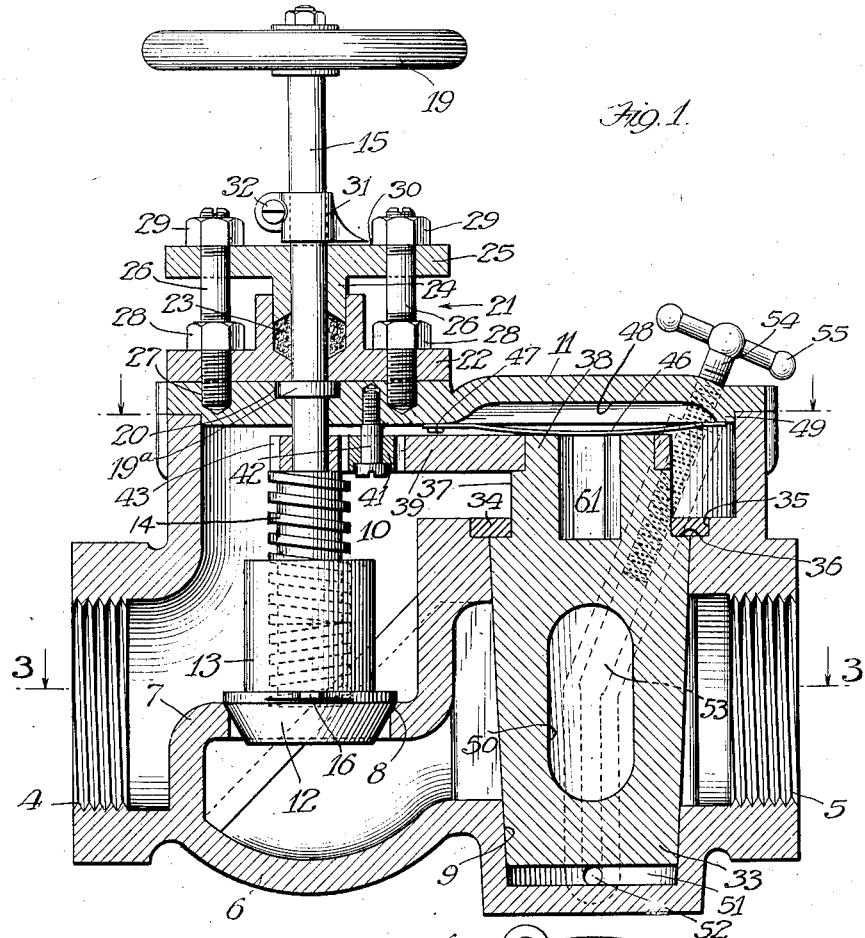
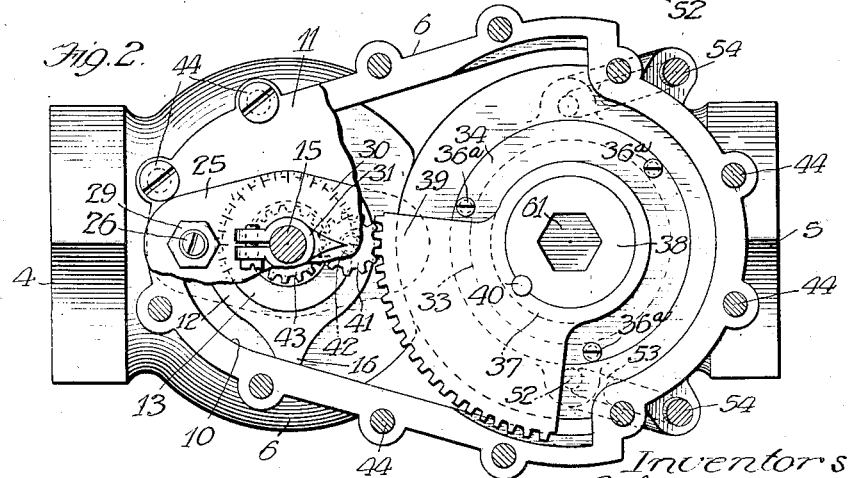

Sept. 8, 1931.  A. F. CORNNER ET AL  1,821,929
VALVE
Filed May 14, 1926   2 Sheets-Sheet 2

Witness
Martin F. Olsen

Inventors
Asa F. Cornner
George W. K. King
By Rector, Hibben, Davis Macauley
Their Atty's Patented Sept. 8, 1931

1,821,929

UNITED STATES PATENT OFFICE

ASA F. CORNNER AND GEORGE W. K. KING, OF COFFEYVILLE, KANSAS, ASSIGNORS OF ONE-SIXTH TO PLUMUS P. HAAG, OF COFFEYVILLE, KANSAS, SEVEN-TWELFTHS TO ROY T. OSBORN, OF NEW YORK, N. Y., ONE-SIXTH TO SAID CORNNER, AND ONE-TWELFTH TO SAID KING

VALVE

Application filed May 14, 1926. Serial No. 108,993.

Our invention relates to a valve fitting containing two closure members, one a reciprocating valve and the other a rotary valve or turning plug so connected that they may be opened and closed together by a single operating means. The fitting is particularly designed for high pressure work and has been developed in connection with the supply of steam for engine and similar high pressure apparatus. It is not confined in its use, however, to steam but is serviceable and advantageous wherever the flow of a fluid is to be controlled and more particularly where the fluid is under high pressure. In some respects a reciprocating, or globe valve as it is sometimes termed, is the most satisfactory cut-off or fluid flow controller, particularly for high pressure purposes, but it is open to the objection that it is subject to wear and in time becomes leaky or otherwise requires repair. Commonly repairs to a valve require the shutting off of the conduit in which the valve is located by another valve or other means until the repairs are completed. Prior to our invention a fitting has been devised to obviate the necessity of closing the conduit in which such a valve is located for the entire period of the repairs by including in the fitting in addition to the reciprocating or so-called globe valve a turning plug or rotary valve operated by the same handle as the reciprocating valve as seen in Patent No. 1,193,780 to Haag, granted August 8, 1916. In normal operation the reciprocating and turning valves are jointly operated and when it is desired to make repairs to the reciprocating valve the common handle is turned to bring the valves to closed position and then the cover plate removed and the reciprocating valve and its associated parts taken out for such repairs or replacement as is found desirable. Our invention is in the nature of an improvement upon that of the patent mentioned in various respects, among which may be mentioned that the operating connection between the two valves is modified to permit a more considerable rotation of the operating handle in opening and closing the valves, efficient means are provided for preventing the sticking of the turning plug and freeing it in case it should be stuck and in general the construction is simplified, cheapened and improved.

In the accompanying drawings we have shown a preferred embodiment of our invention and described it in detail in this specification; but it is to be understood that the specific disclosure is for the purpose of exemplification only and that the scope of the invention is defined in the following claims in which we have endeavored to distinguish it from the prior art without limiting it more than the latter requires.

Figure 4:
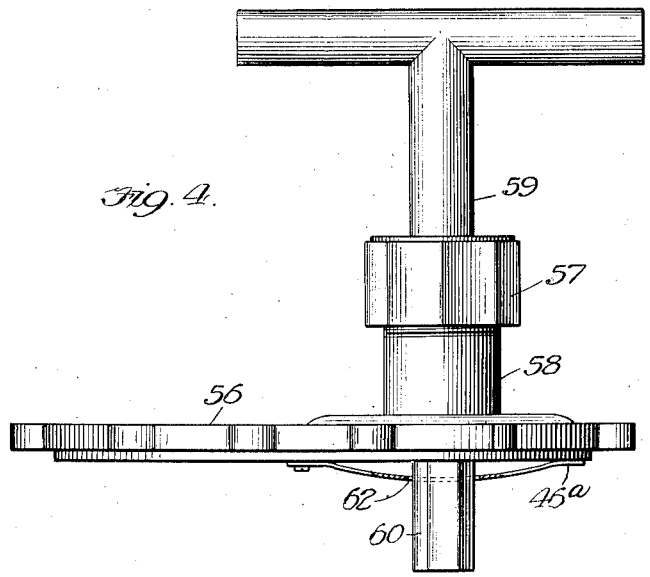

In the drawings, Figure 1 is a vertical diametrical section through a fitting embodying our preferred form of the invention; Fig. 2 a plan partly broken away to show the interior of the fitting; Fig. 3 a horizontal axial section on the line 3—3 of Fig. 1; and Fig. 4 an elevation of an auxiliary cover including a valve operating device.

Each part is identified by the same symbol of reference wherever it occurs in the several views.

The casing 6 of the fitting may be of cast metal, the casting comprising the usual internally threaded ends 4, 5 for the reception of pipe, a diaphragm 7 in which the reciprocating valve seat 8 is located and a tapered bore or chamber 9 for the rotary valve or turning plug. Above the diaphragm is a chamber 10 in which is located the valve operating means. The casting is open above the chamber 10 but in normal use the opening is closed by a cover plate 11 which is bolted or screwed to the main casting in any usual or approved manner.

The reciprocating valve 12 is shown of usual tapered design and provided with an upwardly extending interiorly threaded sleeve 13, the threads being relatively coarse and engaged by the threads 14 on the valve operating stem 15. The sleeve 13 is provided with diametrically opposite lugs 16 which extend into channels 17 formed on the inner face of the wall of the chamber 10 so that said sleeve and valve are free to reciprocate vertically but are prevented from turning by the engagement of the lugs or wings with the above mentioned channels.

The valve operating stem 15 extends through the cover plate 11 and is shown as provided with the usual hand wheel 19 for operating. The valve stem is formed or provided at 19$^a$ with a collar which, when the fitting is assembled, occupies an enlargement or recess 20 in the cover plate. A packing box 21 provided with an elongated flange 22, surrounds the valve operating stem and rests upon the cover plate and upon the collar of the valve stem so as to prevent longitudinal movement of the stem. Thus by rotating the hand wheel the reciprocating valve may be raised and lowered.

The packing box is provided as usual with packing 23 and a gland 24 enters the packing box to compress the packing. The gland is also formed with an elongated flange 25 and the flanges of the packing box and gland are perforated in registry and bolts 26 extend through the perforations or bolt holes and are screwed into the cover plate at 27. Nuts 28 on the bolts engage the flange of the packing box and hold the latter firmly in position and other nuts 29 on said bolts engage the flange 25 of the gland to adjust and hold the latter in adjusted position. The flange 25 of the gland is circumferentially graduated as at 30, Fig. 2 and a pointer 31 is affixed to the valve operating stem and cooperates with the dial so that the position of the valve may be ascertained by looking at the pointer. In order to adjust the pointer for wear, the collar thereof is split on the side opposite the pointer and a screw 32 which may be loosened to permit adjustment of the pointer serves to clamp the collar about the valve operating stem.

A turning plug 33 of similar form occupies the tapered bore or chamber 9 to which reference has been made and controls the passage from the space or chamber below the reciprocating valve and its seat to the nipple 5. The plug or turning valve is held in the chamber 9 by means of a ring 34 seated in a recess or rabbet 35 surrounding the plug and engaging a shoulder 36 on the upper end of the plug. The ring 34 is held in position by screws 36$^a$ which are threaded into the fitting casting.

The plug is formed with a cylindrical neck 37 and above said neck with a reduced portion 38. A gear sector 39 is keyed upon the reduced portion of the neck, the key being shown at 40 so that the plug revolves or oscillates with the sector. The gear sector is in mesh with a gear 41 journaled upon a screw bolt 42 screwed into the under face of the cover plate 11, and said gear engages a similar gear 43 keyed upon the valve operating stem. Obviously when the valve stem is revolved, through said gears and gear sector, the valve plug is revolved and the design is such that the two valves, one reciprocating and the other turning, are open to the maximum together and completely closed together.

The cover plate 11 is secured to the main casting or fitting by bolts 44 extending through holes thereof and screwed into the main casting, the cover being of such shape and size as to completely close the opening in the main casting above the respective valves and their intermediate operating mechanism. A curved plate spring 46 is bolted to the under face of the cover plate at 47 and extends across the concavity 48 of the cover plate and bears at its free end 49 against the latter. Thus, the spring yieldingly holds the turning plug in close engagement with its tapered seat or chamber, and also provides a certain amount of friction to prevent the accidental movement of said valve. The turning plug is ported at 50 and the passage from the space beneath the reciprocating valve to the chamber of the turning plug is of sufficient cross section to provide ample room for the passage of fluid through the fitting.

In order to properly lubricate the turning plug and also to force it slightly from its seat in case it gets stuck, we form the plug chamber slightly longer than the plug to leave a lubricant chamber at 51 beneath the plug, and there are two lubricant passages 52 on the respective opposite sides of the chamber and formed in the main casting communicating with the lubricant space. These passages 52 extend upwardly as shown in dotted lines in Fig. 1 and communicate respectively with enlarged bores or barrels 53 likewise formed in the body of the main casting which is somewhat enlarged for the purpose. The barrels are internally threaded at 53 and receive follower screws 54 provided with handles 55. When the barrels are properly charged with lubricant, by screwing down the followers, the lubricant may be forced into the space beneath the plug and will distribute itself about the walls of the plug cavity or chamber. In case the plug gets stuck by forcibly turning one of the follower screws and driving the lubricant into the space beneath the plug, the latter may be raised sufficiently to free it. Obviously, one of these lubricating devices may be omitted if desired.

In case it is desired to remove the reciprocating valve, this can readily be done by first operating the handle to bring both valves and more particularly the turning plug to closed position and then removing the cover plate. The reciprocating valve, operating handle and the idler will, of course, be removed with the cover plate.

This removal, however, does not affect or change the position of the turning plug. However, if it is desired to use the fitting and the conduit in which it is interposed before repair, replacement or the like of the reciprocating valve is effected, this may be done by substituting for the regular cover plate and its attached parts the temporary cover plate 56 shown in Fig. 4. This cover plate is formed with a stuffing box 57 having the usual gland 58 through which extends an operating handle 59. The plate 56 is provided with openings corresponding to those in the regular cover plate so that it may be readily bolted to the main casting. The lower end of the operating handle 59 is of hexagonal or other irregular shape as shown at 60 and the valve or turning plug is formed at its upper end with a similar shaped cavity 61. The plate spring 46ª is provided with an opening 62 in registry with the cavity 61 to permit the passage of the end of the operating handle therethrough. When the temporary cover plate with its attached parts is in position, it closes the opening in the fitting and the latter may be used, the opening therethrough being controlled by the turning plug and the temporary operating handle.

Obviously, the turning plug is of such character that an unbalanced pressure thereon will not tend to move it. The fitting is particularly adapted for use where a valve construction is required that will not leak under pressure. Furthermore, the construction is decidedly advantageous as compared to the use of separate and independent valves in the same line for the reason, among others, that in the latter one valve is customarily used and the other valve permitted to remain fixed in open position and when it is desired to use the latter, it is frequently found so badly stuck due to its disuse as to be difficult or impossible of operation.

We claim:

1. In a device of the class described, a main casting having inlet and outlet ports and reciprocating and rotary valve seats intermediate said ports, a reciprocating valve cooperating with the first mentioned seat and a rotary valve with the second, a cover plate, a rotary stem mounted in the cover plate and having a threaded connection with the reciprocating valve, gearing intermediate said stem and the rotary valve for operating the latter, an auxiliary cover plate adapted to replace the first mentioned cover plate, a rotary stem mounted therein having a non-cylindrical and extending beneath said plate, the turning plug having a cavity in its upper end to receive the lower end of the last mentioned stem whereby the rotary valve may be operated.

2. In a device of the class described, a main casting having inlet and outlet ports and reciprocating and rotary valve seats between said ports, a reciprocating valve cooperating with the first mentioned seat and a rotary valve with the second, a cover plate, a rotary operating stem mounted in the cover plate and having a threaded engagement with the reciprocating valve for operating the latter, a curved plate spring secured at one end to the cover plate and bearing freely against it at the other end and engaging the upper end of the rotary valve to yieldingly hold it in close engagement with its seat.

ASA F. CORNNER.
GEORGE W. K. KING.